(12) United States Patent
Wu

(10) Patent No.: US 7,755,323 B2
(45) Date of Patent: Jul. 13, 2010

(54) PORTABLE POWER SUPPLY MODULE WITH AUTOMATIC WINDING MECHANISM

(75) Inventor: Michael Wu, Hsin Tien (TW)

(73) Assignee: Formosa Electronics Industries, Inc., Taipei Hsien (TW)

( * ) Notice: Subject to any disclaimer, the term of this patent is extended or adjusted under 35 U.S.C. 154(b) by 109 days.

(21) Appl. No.: 12/078,207

(22) Filed: Mar. 28, 2008

(65) Prior Publication Data

US 2009/0108802 A1 Apr. 30, 2009

(30) Foreign Application Priority Data

Oct. 24, 2007 (TW) .............................. 96217828 U

(51) Int. Cl.
*H02J 7/00* (2006.01)
(52) U.S. Cl. ...................... 320/114; 320/103; 320/107; 439/501
(58) Field of Classification Search ................ 320/103, 320/107, 114; 439/501, 502
See application file for complete search history.

(56) References Cited

U.S. PATENT DOCUMENTS

| | | | | |
|---|---|---|---|---|
| 5,711,558 A | * | 1/1998 | Woody | 292/335 |
| 6,861,822 B2 | * | 3/2005 | Wei | 320/111 |
| 6,909,259 B2 | * | 6/2005 | Chung | 320/107 |
| 7,072,200 B2 | * | 7/2006 | Lanni | 363/146 |
| 7,489,952 B2 | * | 2/2009 | Simoes et al. | 455/573 |
| 7,554,828 B2 | * | 6/2009 | Wilson | 363/146 |
| 7,563,130 B2 | * | 7/2009 | Farrar et al. | 439/501 |
| 2007/0182368 A1 | * | 8/2007 | Yang | 320/110 |

* cited by examiner

*Primary Examiner*—Edward Tso
*Assistant Examiner*—Ramy Ramadan
(74) *Attorney, Agent, or Firm*—Rosenberg, Klein & Lee

(57) ABSTRACT

A portable power supply module with winding mechanism is disclosed, which includes a shell body, a battery room formed at the shell body for accommodating at least one battery, a connection line, a pulling compartment in the shell body for accommodation of the connection line and a winding mechanism located in the pulling compartment. At least one set of conductive contact plates are provided and are connected to a circuit board to a supply power from the battery. A first end of the connection line is connected to the circuit board and a second end of the connection line is connected to an output connector. When the connection line is pulled and the winding mechanism slides forward to extend the connection line. When the portable power supply module is not in use, the winding mechanism pulls and retracts the connection body in the shell body.

5 Claims, 4 Drawing Sheets

PORTABLE POWER SUPPLY MODULE WITH AUTOMATIC WINDING MECHANISM

FIELD OF THE INVENTION

The present invention relates to a portable power supply module, especially to a portable power supply module having a winding mechanism that can automatically wind a connection line.

BACKGROUND OF THE INVENTION

With the rapid development of technology in the society today, people have a variety of portable electronic equipment, such as cell phones, notebook computers, walkmans, portable memory hardware, PDAs, digital cameras, etc., that have been often used by people in different industries and become indispensable in our lives. Nowadays, portable electronic equipment has a variety of functions and is complicated. The most important issue is how to solve the problem of providing electrical power at power exhaustion and recharging the batteries rapidly and conveniently. Some prior arts provide solutions to the problem.

Taiwan Invention Patent No. 200711256 discloses a portable charging device that is installed in a notebook computer or other portable electronic equipment for recharging the small electronic equipment to increase its working time. The portable charging equipment comprises a battery, a charging switch, and a charging cable. The battery is rechargeable for notebook computer or other portable electronic equipment to a supply power required at operation. The charging cable is used to connect to the small electronic equipment; the charging switch is connected to the battery and the charging cable for controlling the power to recharge the small batteries of small electronic equipment thereof.

Taiwan Invention Patent No. 200637101 discloses a portable charging device of a portable electronic device, that solves the problems that the conventional portable electronic devices can only rely on the supplement of public supply power and that multiple charging devices are needed. The use of auxiliary power supply equipment will increase the space and burden of weight that cause inconveniences. The portable charging device comprises a charging base, a back plate assembly, a loaded base, and the battery cores arranged in the charging base. The loaded base is assembled by an auxiliary positioning mechanism. A portable electronic device that is needed to be charged can be loaded in the loaded base and can be connected to the connector on the charging base to obtain electricity Taiwan Invention Patent No. 200614626 discloses a kind of convenient and economical portable charging equipment that is small in size and can be held in a hand, whereby it uses an embedded secondary battery to provide electricity and an external connector to transmit data to the electronic equipment or receive data from the electronic equipment for the sake of convenience of charging the portable electronic equipment.

Portable electronic equipment primarily depends on built-in power supply, for example the batteries made of lithium or nickel-cadmium in the mobile phones. When the built-in power supply is exhausted, how the batteries can be recharged rapidly and simultaneously that has been chasing as one of the improving targets.

There are many kinds of electronic equipments. Therefore, it is possibly happened that the electronic equipments have the same or different functions, and they may require different specifications of charging devices or different interfaces that do not allow them to use the same charging devices. Under the circumstances, it usually results that users have to prepare additional rechargeable batteries and charging devices to meet the requirements of different equipments, which produce the problems of occupying space and causing inconvenience.

In addition, the industry has already developed many portable charging devices, but this kind of portable charging device is usually provided with at least a charging device and a connection line that do not comprise any winding unit for winding the connection line. This kind of portable charging device without winding unit is usually divided into two types. First, the connection line and the charging device are separable. The connection line and the charging device are connected together when they are in use. The second type comprises an integrated structure that the charging device is fixedly connected to the connecting line.

The first design with separable connection line causes a trouble of carrying that can increase the risk of loss, the occupying space of carrying and a chore of categorizing parts. The second design of connecting the charging device to the connection line has the least risk of loss, but it has the damages to the connecting point of the connection line and charging device due to pressing or accidental pull. The second design has the same drawbacks of occupying space and not possessing winding function as the first design.

SUMMARY OF THE INVENTION

The primary object of the present invention is to provide a portable power supply module using a regular battery as a power supply. A connection line of the portable power supply module supplies power from the battery via an output connector to a rechargeable electronic equipment.

Another object of the present invention is to provide a portable power supply module with automatic winding function. A flexible winding mechanism is arranged in a shell body, to which a connection line is slidably fastened. The winding mechanism is slidable to move forward to extend the connection line or to move backward to retract the connection line.

To fulfill the above objects, the present invention provides a portable power supply module with automatic winding mechanism. The portable power supply module comprises a shell body, a battery room formed at the shell body for accommodating at least one battery, a connection line, a pulling compartment formed in the shell body for accommodation of the connection line and a flexible winding mechanism located in the pulling compartment. At least one set of conductive contact plate are provided and are connected to a circuit board. A first end of the connection line is connected to the circuit board, and a second end of the connection line is connected to an output connector extended outside the shell body. The output connector is used to connect to a rechargeable electronic equipment.

The flexible winding mechanism is slidably connected to the connection line. When the output connector is pulled, the winding mechanism is pulled to move forward and extend the connection line outside the shell body. A locking member with a hook mechanism is used to lock the winding mechanism after the connection line extends for a predetermined length outside the shell body. When the work is done, by pushing a button to move the hook mechanism backward manually, the winding mechanism is released and moves backward to pull the connection to retract inside the shell body.

By means of the portable electrical power supply module, variable electronic equipment can be recharged rapidly through the output connector, such as an USB interface connection plug.

With the winding mechanism, the portable power supply module is capable to automatically wind the connection line back to the shell body after recharging. Such a design is not only helpful for easy carrying and also for reducing malfunction resulting from external squeeze or accidental touch to the connection.

DETAILED DESCRIPTION OF THE PREFERRED EMBODIMENTS

Figure 1:
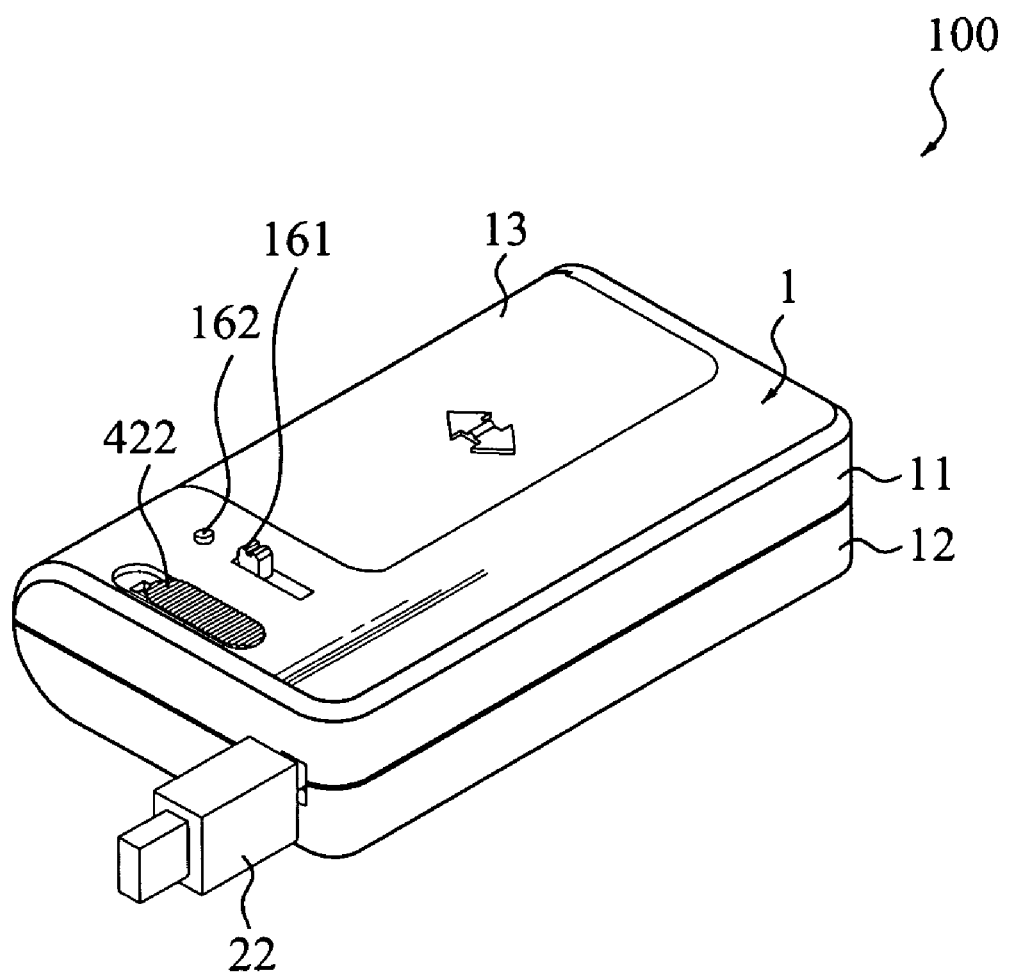
FIG. 1 shows a perspective view of a portable power supply module with automatic winding mechanism according to a preferred embodiment of the present invention.
Figure 2:
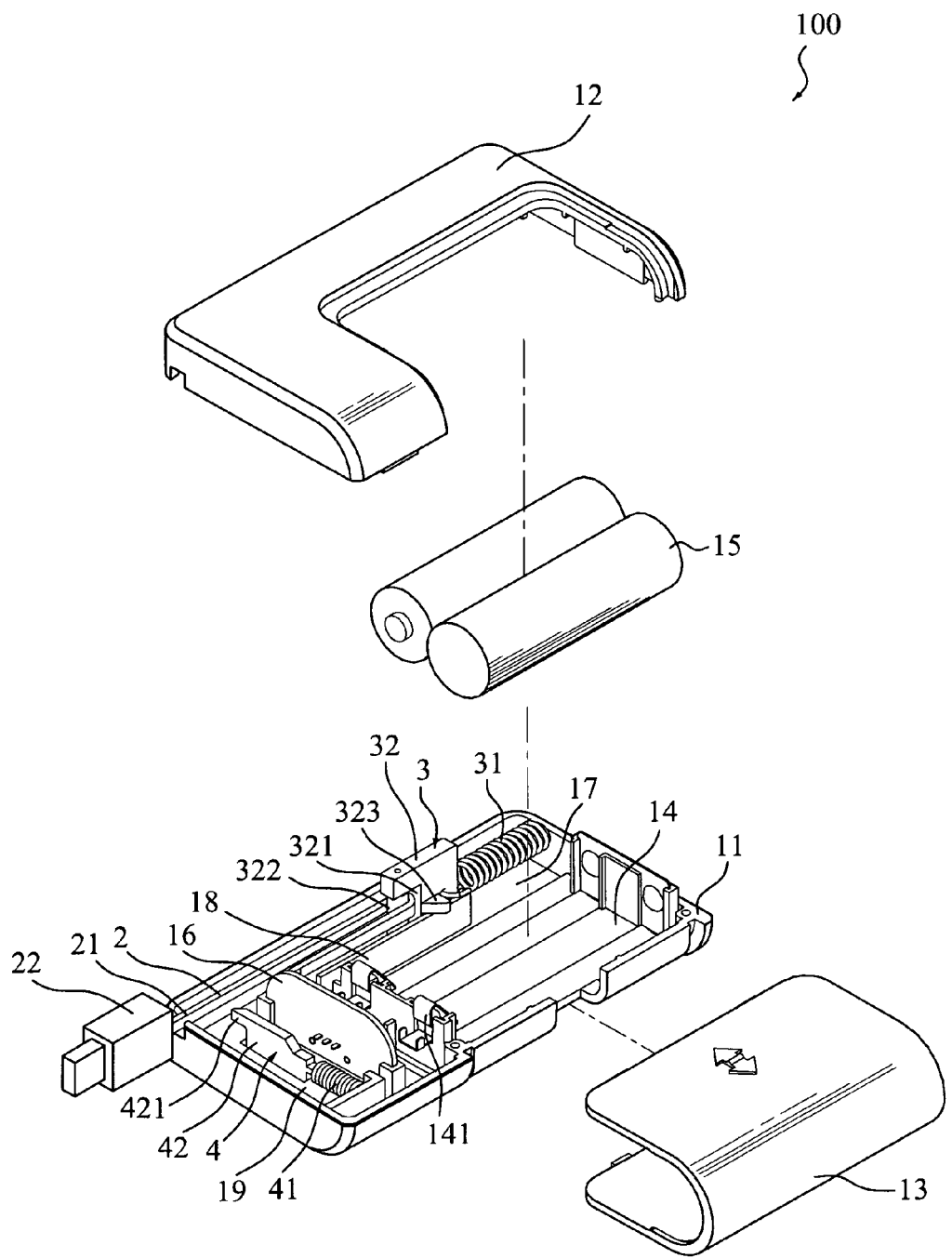
FIG. 2 shows an exploded perspective view of the portable power supply module.

Referring to FIGS. 1 and 2, FIG. 1 shows a perspective view of a portable power supply module with automatic winding mechanism according to a preferred embodiment of the present invention, and FIG. 2 shows an exploded perspective view of the preferred embodiment of the present invention. As shown in the drawings, a portable power supply module 100 constructed according to the present invention comprises a shell body 1. The shell body 1 comprises a rigid base 11, a lid 12, and a sleeve 13, wherein the lid 12 can be correspondingly fastened to the base 11 and then the sleeve 13 can also correspondingly and laterally be put to the base 11 and the lid 12 to form the shell body 1.

The internal part of the shell body 1 is formed with a battery room 14 comprising at least one set of conductive contact plates 141. The battery room 14 may accommodate two batteries 15 to supply electrical power via the conductive contact plates 141 which are connected to a circuit board 16. The circuit board 16 comprises a power switch 161 and a power indicating lamp 162 which may comprise a LED. Through the power switch 161, the portable power supply module 100 can control the on and off of power. The power indicating lamp 162 is lighted on when the power switch is turned on.

The shell body 1 is provided with a connection line 2 of a predetermined length. A first end of the connection line 2 is connected to the circuit board 16, and a second end 21 of the connection line 2 is connected to an output connector 22. The output connector 22 may comprise an USB interface connection plug extending to the outside of the shell body 1.

The shell body 1 is formed with a pulling compartment 17 where a flexible winding mechanism 3 and a sliding rail assembly 18 are arranged. The sliding rail assembly 18 is used for guiding the flexible winding mechanism 3 to slide along the sliding rail assembly 18. The winding mechanism 3 comprises an elastic member 31 and a joint member 32 fastened to the elastic member mechanism 31. The joint member 32 comprises an opening 321, a holding post 322 and a hook 323. The connection line 2 passes through the opening 321 and winds around the holding post 322, and accordingly the joint member 32 is fastened to the connection line 2. By means of the joint member 32, the elastic member 31 is hooked by the connection line 2. The elastic member 31 is elastic and can be pulled to stretch. When the connection line 2 sustains a pulling force, it in turn pulls the winding mechanism 3 to move forward and drives the winding mechanism 3 to slides along the sliding rail assembly 18. Under this circumstance, the elastic member 31 is pulled to stretch longitudinally.

The shell body 1 also comprises a locker compartment 19 where a locking member 4 is arranged. The locking member 4 comprises an elastic member mechanism 41 and a hook mechanism 42. The hook mechanism 42 comprises a protruding end 421 acting as a hook and a button 422. The hook mechanism 42 is connected to the elastic member mechanism 41.

Figure 3:
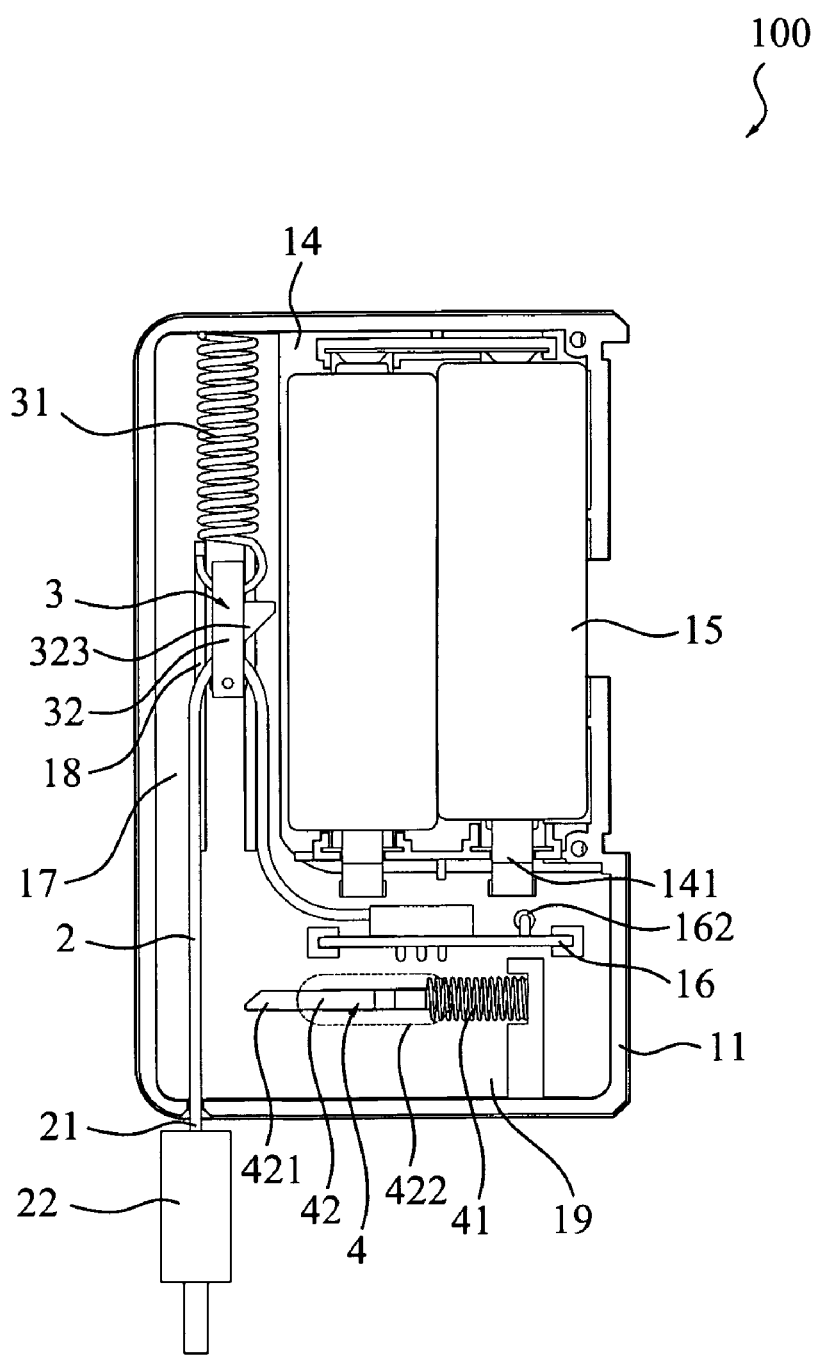
FIG. 3 is a schematic view showing that a connection line is received in the portable power supply module of the portable power supply module.
Figure 4:
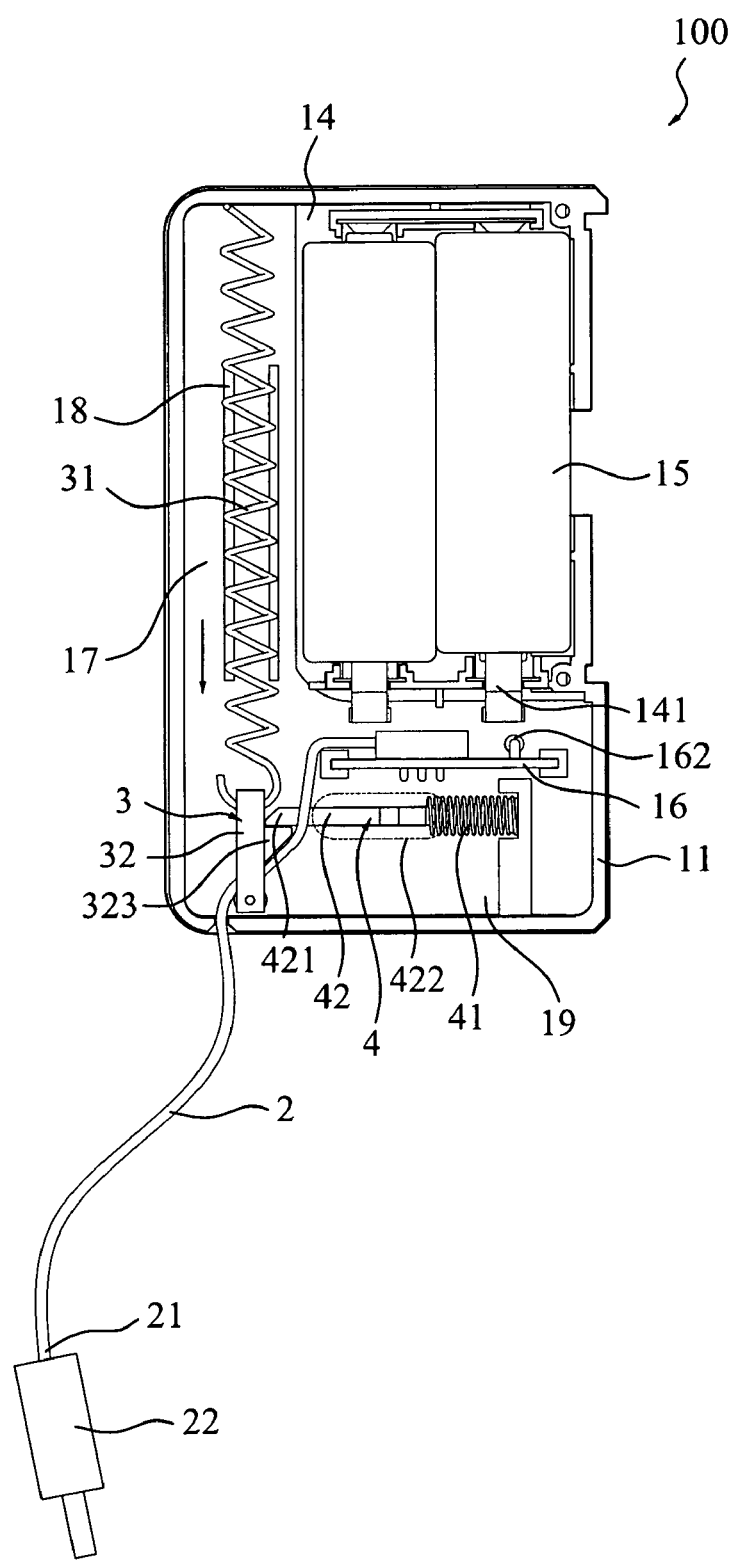
FIG. 4 is a schematic view showing that of the connection line is extended from the portable power supply module.

Referring to FIGS. 3 and 4, FIG. 3 is a schematic view showing that the connection line is received in the portable power supply module of the preferred embodiment of the present invention, and FIG. 4 is a schematic view showing that of the connection line is extended from the portable power supply module. As it can be seen from the drawings, when the portable power supply module is not in use, the connection line 2 is received in the shell body 1. The connection line 2 is pulled by the winding mechanism 3 to accommodate in the pulling compartment 17. And as FIG. 4 illustrates, when the portable power supply module is in use, the connection line 2 is pulled to extend. When the output connector 22 is pulled by an external force, the connection line 2 is pulled also. In turn, the elastic member mechanism 31 is stretched to allow the joint member 32 to slide along the sliding rail assembly 18, enabling the connection line 2 to extend outside of the shell body 1. When the winding mechanism 3 is pulled to a predetermined length, the hook 323 passes the protruding end 421 and then is locked by the protruding end 421 of the locking member 4. Therefore, the connection line 2 is maintained extending outside the shell body 1. By pushing the button 422 of the hook mechanism 42 to make the protruding end to move backward, the user can manually release the hook 323. During to the elasticity of the elastic member 31, the connection line 2 is pulled by the winding mechanism 3 to move backward and the connection line 2 automatically retracts into the pulling compartment 17 as that shown in FIG. 3.

While the present invention has been described with reference to the specific embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claimed is:

1. A portable power supply module, comprising:
a shell body, the shell body having:
a locker compartment including a locking member disposed within;
a battery room having:
at least one set of conductive contact plates which are connected to a circuit board;
at least one battery to supply electrical power through the conductive contact plates; and
a connection line with a first end connecting to the circuit board and a second end connected with an output connector extended outside the shell body; and
a pulling compartment formed in the shell body for storage of the connection line, a winding mechanism being disposed within at the pulling compartment, to which the connection line is slidably fastened;

wherein the winding mechanism further comprises a joint member having an opening and a holding post, and the connection line passes through the opening and winds around the holding post for slidably securing to the winding mechanism;

wherein when the output connector is pulled, the winding mechanism slides along the pulling compartment to enable the connection line to be fully extended to outside of the shell body, and when the connection line is not in use, the winding mechanism pulls the connection line to fully retract the connection line into the pulling compartment.

2. The portable power supply module as claimed in claim 1, wherein the locking member comprises a protruding end for fastening.

3. The portable power supply module as claimed in claim 2, wherein the winding mechanism comprises a hook, and when the winding mechanism is pulled to a predetermined length, the protruding end of the locking member fastens the hook of the winding mechanism.

4. The portable power supply module as claimed in claim 3, wherein the locking member further comprises a button, and when the button is pushed, the protruding end of the locking member is moved backward and the hook of the winding mechanism is released.

5. The portable power supply module as claimed in claim 1, wherein the output connector comprises an USB interface connection plug.

* * * * *